Oct. 22, 1940.  R. A. ROAD  2,218,552
RESETTABLE REGISTER FOR METERS
Filed April 4, 1938
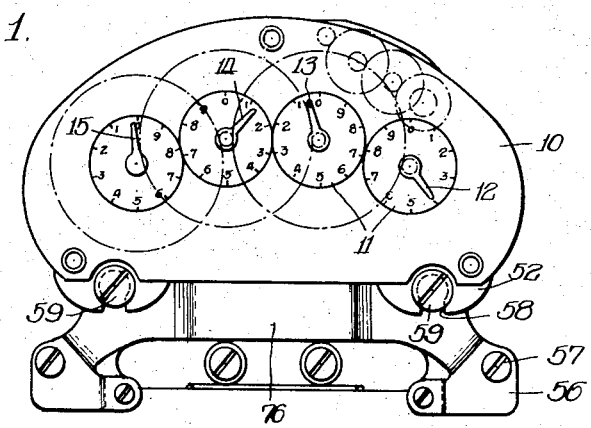
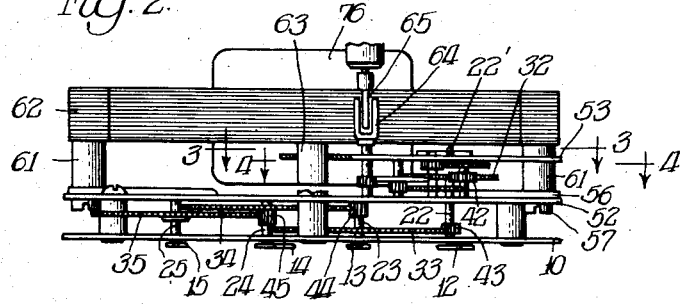
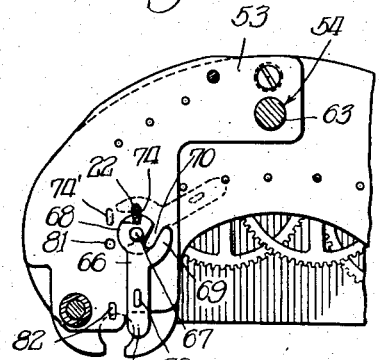
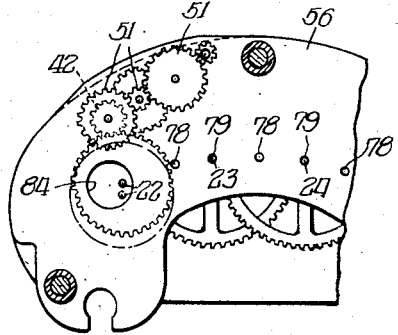
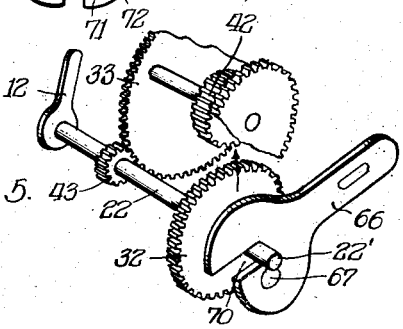
Inventor:
Richard A. Road,
By Louis Robertson
Atty.

Patented Oct. 22, 1940

2,218,552

UNITED STATES PATENT OFFICE 2,218,552

RESETTABLE REGISTER FOR METERS

Richard A. Road, La Fayette, Ind., assignor to Duncan Electric Manufacturing Company, La Fayette, Ind., a corporation of Illinois Application April 4, 1938, Serial No. 199,786

7 Claims. (Cl. 235—144)

This invention relates to registers such as are used, for example, in integrating watt-hour meters. Everyone is familiar in a general way with such registers, since it is from the face of the register with its four or five hands that the meter reading is taken. Each hand or pointer rotates within a circle marked off with the ten numerals from zero to nine so that each pointer indicates one digit of the meter reading. The pointers are of course geared together successively in the ratio of 10 to 1 so that each pointer makes ten revolutions while the pointer to its left, of next higher order, makes one.

The units pointer, by which is meant the pointer on the right which indicates the last digit of the meter reading, is driven by the meter through a train of reducing gears. The ratio of the gearing is of course determined by the constants of the meter, the meter designers selecting whatever ratio will convert the revolutions of the disc in a given meter design to the units of measurement desired, such as kilowatt hours. The first stage of the reduction is generaly in the form of a worm drive between the shaft of the meter disc and the first gear, but another portion of the reduction should be in the register itself so that any one of the various meter ratios which are likely to be suitable may be obtained by the choice of a register which is designed to provide the desired ratio. Furthermore, space requirements within the meter and convenience of manufacture wil often dictate that part of the reduction gearing be in the register.

The reduction gearing has two incidental effects. One is that it permits the register to be advanced with almost no effort on the part of the meter disc, and the other is that it makes resetting of the register to zero relatively difficult. Of course, the register is always removed from the meter to reset it since it would be impossible to turn the meter disc through the worm gear, but if the register is then set back to zero by manipulating its drive shaft or even the gear for the units or tens pointer, it is likely to take many minutes of turning to get the hundreds or thousands pointer zeroized. It is obvious that the gear on the pointer indicating the tens digit must be turned through 50 revolutions to turn the thousands pointer half a revolution from a reading of five to a reading of zero. If a fifth pointer corresponding to tens of thousands is used, the corresponding number of revolutions of the tens pointer required would be 500. It is usually impossible to drive the gearing at high speed by turning the thousands pointer directly because from this point the slight friction at the lower end of the reducing train is so magnified as to be self-locking in nature and absolutely prevent movement of the gears by pressure exerted on the gear wheel corresponding to the thousands pointer. Even if the register could be set back in this manner, the frictional and air resistance of the lower gears and connecting parts as they turned at high speed would be so great as to limit the speed of movement of the thousands digit so that even this method of resetting would be difficult and irksome.

In actual practice in the past, resetting the register to zero has been a rather haphazard operation. A method frequently used is to twist the pointers on the staffs, an operation which is apt to loosen the pointers, even if it does not cause the more serious damage of bending or distorting the staffs or gear teeth. Another method has been to loosen the mounting post screws which hold the plates until some appropriate gear can be slipped out of mesh. A modification of this scheme is to provide a small pivot screw which can be unscrewed, thereby allowing the desired staff to be moved out of mesh. Still another method is to provide a machine which will drive the reducing gearing in the reverse direction at high speed. All of these schemes show a recognition of the problem but do not solve it since they either require a special machine or involve considerable difficulty, and may result in leaving the register in an inoperative condition.

For many years the meter industry has put up with these difficulties, which were of course well recognized by anyone who reset a register, but for which there did not seem to be any ready solution. According to the present invention the difficulties of resetting the register are entirely overcome by providing a simple and easily manufactured means for disconnecting the train of reducing gears from the units pointer so that the pointer for one of the higher digits may be turned directly, opposed only by the resistance in connection with the pointers themselves and the decimating gearing between the pointers. I have found that with such reducing gearing disconnected, the thousands pointer may be turned half a revolution in an interval of only around five seconds. The frictional and air resistance of the units pointer, turning about 100 revolutions a second, prevents the parts from being turned much faster than this, incidentally indicating how hopeless it would be to turn them fast with the reducing gearing connected.

One feature of the invention is the provision of a commercially practical construction for making possible the disconnection of the reducing gearing. According to this invention an exceedingly simple expedient first taught in Harris Patent No. 1,696,087 is utilized of tilting the shaft of the units pointer by a pivoted cam lever in a manner to separate one gear thereon from the reducing gear train without separating another gear on the units shaft from the decimating gear on the tens shaft. The present invention is an improvement thereon in several respects, one of which is that the tilting shaft moves in a direction mainly tangential to the integrating gear which it drives so that there will be no danger of the integrating gearing being disconnected and no extreme manufacturing care will be necessary to prevent such an undesirable occurrence. Another improvement is in avoiding the danger that the register will be placed on the meter with the driving gears disconnected.

From the foregoing it is evident that an object of the invention is to facilitate resetting of a meter register to zero.

Subordinate and additional objects and related advantages will be apparent from the description and from the drawing, in which:

Fig. 1 is a front elevation of the register chosen for illustration, showing its relationship to a meter.

Fig. 2 is a plan view of the register shown in Fig. 1, also showing its association with a typical meter.

Fig. 3 is a fragmentary view of the register, being taken on the line 3—3 of Fig. 2.

Fig. 4 is a fragmentary sectional view of the register showing the reducing gearing and indicating the separation of one gear from another, the figure being taken on the line 4—4 of Fig. 2.

Fig. 5 is a somewhat diagrammatic view showing the gear on the units shaft separated from its driving gear.

Fig. 6 is a fragmentary rear view of a slightly modified form of register shown in combination with a cooperating meter frame member.

Although this invention may take numerous forms, only two have been chosen for the purpose of illustration. In both forms the invention may be used in connection with a register which includes a dial plate 10 inscribed with the four dials 11, and the four pointers 12 to 15. The pointer 12 indicates the units in the meter reading and may therefore be called the units pointer and its shaft 22 may be called the units shaft, the gear 32 thereon by which it is driven being called the units gear. Likewise, the tens pointer 13 is carried by a tens shaft 23 which carries and is driven by a tens gear 33. The same numbering plan is applied to the corresponding hundreds part and to the corresponding thousands parts. Each of the gears 32, 33, 34 and 35 is driven by a pinion 42, 43, 44 or 45. The pinion 42 may be regarded as the last gear in a train of reducing gears 51. As seen best in Fig. 2, the shafts 23, 24 and 25 are rotatably carried between dial plate 10 and a center plate 52 which may also be called the main support plate for the register. The reducing gears 51 are suitably carried on shafts rotatably journaled between the center plate 52 and a back plate 53. The units shaft 22 extends between the front plate 10 and the back plate 53 and in fact is provided with a pivot stud 22' extending through the back plate to facilitate manipulation of the shaft 22, as described below. The plates are rigidly secured in spaced relation by conventional spacing posts and screws.

The register is desirably supported by the meter in some readily removable manner. In the illustrated embodiment a mounting plate 56 is secured to the meter element in any suitable manner as by screws 57, and the support plate 52 of the register is provided with slots 58 which fit over screws 59 screwing into the mounting plate 56. The screws 57 screw into spacer rivets 61 which hold together the laminations 62 of the driving magnet. One manufacturer provides his laminations 62 with a top spacer rivet 63 for reasons which need not be explained here. For the purpose of further steadying the register, the back plate 53 may be provided with a hole 54 which slips over the spacer rivet 63. The use of all three spacer rivets in this manner permits utilizing the standard driving magnet structure which is utilized in other connections without changing it to accommodate the register. By loosening the screws 57 the register may easily be slipped off of the meter, its driving connection with the meter being through a separable coupler such as the U-shaped member 64 telescoping over the flat driving blade 65. It may be noted that this is a very compact coupling arrangement which may hug close to the laminations 62 for the purpose of conserving space. Of course, when space is available the coupling may be positioned behind the laminations 62, in which case conventional but less compact types of couplers may be used.

With the register removed from the meter the disconnection of its reducing gears from the integrating train may be easily accomplished by manipulation of a cam lever 66. This lever has the effect, best seen in Fig. 5, of tilting the units shaft 22 to separate the units drive wheel 32 from its driving pinion 42. This obviously leaves the gear or wheel 32 and the various pointers free to turn without having to turn the pinion 42 or the remainder of the reducing train 51. Pinion 42 is angularly spaced about shaft 22 from the tens gear 33 so that the tilting of shaft 22 is approximately tangential to gear 33 and hence avoids all danger of separating pinion 43 from gear 33.

The cam lever 66 is pivoted to the back plate 53 by a rivet 67 and is normally positioned as shown in full lines in Fig. 3. It includes a center portion 68 and an outer portion 69, between which lies a cam slot 70. The handle 71 of the cam lever is provided with a detent 72. The units shaft 22 extends through a slot 74 in the back plate 53 and is normally held in the upper end of that slot by the circular edge of center portion 68 of the cam lever 66, which is locked in the position shown by virtue of the fact that the detent 72 fits in a slot in the back plate 53. When the handle 71 is turned, the outer hook portion 69 of the cam lever engages the shaft 22 and causes it to ride into the slot 70 to the lower end of the slot 74. This tilts the shaft 22 as seen in Fig. 5 and as indicated by the dotted line position of the shaft in Figs. 3 and 4. With the parts in this position the pointers may be turned quite quickly and easily by turning the thousands or hundreds gear with one finger.

As a safeguard to prevent application of the register to the meter with the gears disconnected, the cam lever 66 is so arranged that the handle 71 projects inwardly from the back plate 53, as shown in Fig. 3, which it is in the gear disconnecting position. The purpose of this is so that it will strike a part of the meter element and prevent the register from being applied to the element. In the illustrated form handle 71 would strike the front side of the potential coil 76. If this coil 76 were not so located, a special projection 77 would be provided on the meter frame as seen in Fig. 6 to cooperatively interfere with handle 71 for the same purpose. The form of the reset cam lever in Fig. 6 is somewhat different from that in the other figures since it is provided with two closed cam slots 70' instead of having a single open cam slot as in the other figures. Two slots are provided for alternative positions of the operated shaft 22 (slots 74 and 74'), the reset lever being pivoted at the same point for both shaft positions, and the angular movement of the reset lever of Fig. 6 is somewhat smaller. It should be observed that with both forms of the reset lever the cam portion is so shaped that the shaft 22 does not begin to move until the handle 71 has been moved to a position in which it would interfere with the fixed portion of the meter. This important feature positively prevents application of the register to the meter unless the shaft 22 has been moved all the way to its meshing or operating position and also positively prevents moving the shaft from this position while the register is in place on the meter.

The register has been illustrated with four pointers, but sometimes five pointers are desired for the purpose of making indications running into the tens of thousands. For this purpose and to avoid duplication of parts the plates 52 and 53 are provided with alternative punchings. Thus, the plate 52 has five alternative pivot holes 78, three of which are visible in Fig. 4, in addition to the pivot holes 79 which are in use. The plate 53, as seen in Fig. 3, is provided with an alternative slot 74' for the shaft 22, an alternative hole 81 for the rivet 67, and an alternative slot 82 for the detent 72. Since the shaft 22 must be capable of tilting in each position, the plate 53 is provided with one hole 84 large enough so that the shaft 22 can tilt at one side of the hole in a four-pointer register and at the other side of the hole in a five-pointer register.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A register for meters and the like including a first indicator shaft; a gear, a pinion and an indicator thereon; additional indicators driven through integrating gearing by the pinion; reducing gears including a drive pinion meshing with said gear for driving the indicators, the drive pinion being positioned to mesh with the gear at a position displaced approximately 90° angularly from the position with which the integrating gearing meshes with the first named pinion; and means for tilting the shaft in a direction away from the drive pinion while maintaining the integrating gearing approximately in full mesh with the first named pinion.

2. A register for meters and the like including a first indicator shaft; a gear, a pinion and an indicator thereon; additional indicators driven through integrating gearing by the pinion; reducing gears including a drive pinion meshing with said gear for driving the indicators, the drive pinion being positioned to mesh with the gear at a position displaced angularly from the position with which the integrating gearing meshes with the first named pinion; and means for tilting the shaft with a movement which, considered as a whole, is in a direction away from the drive pinion and approximately tangential to the associated integrating gear, thus maintaining the integrating gearing approximately in full mesh with the first named pinion.

3. A register for meters and the like including three spaced plates, integrating gearing between one pair of the plates, and reducing gearing between the second pair of the plates with a shaft extending through the middle plate and geared to both sets of gearing, one end of the shaft being journaled in a slot in the back plate to permit its movement to disengage it from the reducing gearing, and a cam lever secured to the back plate, having a cam portion engageable with the shaft, and movable thereon for tilting the shaft and for holding it from tilting.

4. A register for meters and the like, including three spaced plates, integrating gearing between one pair of the plates, and reducing gearing between the second pair of the plates with a shaft extending through the middle plate and geared to both sets of gearing, one end of the shaft being journaled in a slot in the back plate to permit its movement to disengage it from the reducing gearing, and a cam lever secured to the back plate, having a slot engageable with the shaft, and movable thereon for tilting the shaft and for holding it from tilting.

5. The combination of a register for watt-hour meters and the like, including integrating pointers driven by integrating and reducing gearing, having gears meshing with driving pinions, and means for separating a gear and its driving pinion in said gearing for the purpose of making it possible to easily turn back the integrating pointers to zero, and having a part movable from a normal to a displaced position in separating a gear and pinion, and a meter unit, to which the register may be attached, having means positioned to block said part to prevent its movement to the displaced position when the register is attached to said unit.

6. The combination of a register for watt-hour meters and the like, including integrating pointers driven by integrating and reducing gearing, having gears meshing with driving pinions, and means for separating a gear and its driving pinion in said gearing for the purpose of making it possible to easily turn back the integrating pointers to zero, and having a part movable from a normal to a displaced position in separating a gear and pinion, and a meter unit, to which the register may be attached, having means positioned to prevent the attachment of the register to the unit when the part is in its displaced position.

7. The combination of a register for watt-hour meters and the like, including integrating pointers driven by integrating and reducing gearing, having gears meshing with driving pinions, and means for separating a gear and its driving pinion in said gearing for the purpose of making it possible to easily turn back the integrating pointers to zero, and having a part movable from a normal to a displaced position in separating a gear and pinion, and a meter unit, to which the register may be attached, having means positioned to block said part to prevent its movement to the displaced position when the register is attached to said unit, said means being also positioned to prevent the attachment of the register to the unit when the part is in its displaced position.

RICHARD A. ROAD.